United States Patent [19]

Scheps

[11] Patent Number: 5,276,695
[45] Date of Patent: Jan. 4, 1994

[54] MULTIFREQUENCY, RAPIDLY SEQUENCED OR SIMULTANEOUS TUNABLE LASER

[75] Inventor: Richard Scheps, Del Mar, Calif.

[73] Assignee: The United States of America as represented by the Secretary of the Navy, Washington, D.C.

[21] Appl. No.: 970,328

[22] Filed: Oct. 26, 1992

[51] Int. Cl.⁵ .............................. H01S 3/106
[52] U.S. Cl. ........................ 372/20; 372/23
[58] Field of Search ....................... 372/20, 23

[56] References Cited

U.S. PATENT DOCUMENTS

| | | | |
|---|---|---|---|
| 3,603,685 | 9/1971 | Heflinger et al. | 372/20 X |
| 3,626,322 | 12/1971 | Strouse et al. | 372/23 |
| 4,287,486 | 9/1981 | Javan | 372/20 |
| 4,441,186 | 4/1984 | Erickson | 372/19 |
| 4,745,606 | 5/1988 | Uehara et al. | 372/23 |
| 4,823,357 | 4/1989 | Casey | 372/92 |
| 4,897,843 | 1/1990 | Scott | 372/20 |
| 4,920,541 | 4/1990 | Baumgartner et al. | 372/23 |
| 4,956,843 | 9/1990 | Akhaven-Leilabady et al. | 372/23 |
| 5,007,060 | 4/1991 | Hall | 372/23 |
| 5,020,073 | 5/1991 | Alfrey et al. | 372/105 |
| 5,091,912 | 2/1992 | Bretenaker et al. | 372/23 |
| 5,214,659 | 5/1993 | Terada et al. | 372/20 |
| 5,214,664 | 5/1993 | Paoli | 372/23 X |

OTHER PUBLICATIONS

H. S. Pilloff, "Simultaneous Two-Wavelength Selection in the $N_2$ Laser-Pumped Dye Laser", *Applied Physics Letters*, vol. 21, 1972, pp. 339-340 (Oct.).

C. Wu et al., "Simultaneous Two-Frequency Oscillation in a Dye Laser System", *Optic Communications*, vol. 7 (Mar.) 1973, pp. 233-236.

H. Lotem et al., "Double-Wavelength Laser", *Applied Physics Letters*, vol. 27, 1975, (Sep.) pp. 344-346.

C. J. Buczek et al., "Laser Injection Locking", *Proceedings of the IEEE*, vol. 61, No. 10, Oct. 1973, pp. 1411-1431.

A. L. Bloom "Modes of a Laser Resonator Containing Tilted Birefringent Plates", *Journal of the Optical Society of America*, vol. 64, No. 4, Apr. 1974, pp. 447-452.

*Primary Examiner*—John D. Lee
*Attorney, Agent, or Firm*—Harvey Fendelman; Thomas Glenn Keough

[57] ABSTRACT

A tunable solid state laser produces a laser emission at one or more wavelengths simultaneously. The tunable solid state laser includes a laser resonator defined by an output coupler reflective element, two fold mirrors, and one or more high reflectivity end elements to form a reflective path in a laser resonator cavity therebetween with a laser crystal disposed in the laser resonator cavity. A means for optically exciting the laser crystal is appropriately disposed for end pumping the laser crystal to produce a laser emission in a predetermined range of wavelengths. A wavelength dispersing element such as a prism is disposed in the laser resonator cavity between one of the fold mirrors and the high reflectivity end elements for tuning the laser emission at one or more of the desired wavelengths in the predetermined range of wavelengths, the dispersing element being transparent to the laser emission over the predetermined range of wavelengths. Wavelength tuning of each wavelength can be accomplished by a simple angular rotation of the appropriate high reflectivity end element. The tunable solid state laser can further include a plurality of birefringent optical plates oriented at Brewster's angle in the reflective path in the laser resonator cavity or line-narrowing etalons, or optical shutters, Q-switches or other optical elements.

42 Claims, 7 Drawing Sheets

MULTIFREQUENCY, RAPIDLY SEQUENCED OR SIMULTANEOUS TUNABLE LASER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to lasers and particularly to a tunable solid state laser for producing a laser emission at one or more laser wavelengths simultaneously over a preselected wavelength range.

Multifrequency operation of a tunable solid state laser is desirable when there is independent wavelengths and bandwidth control of each output wavelength since such a device can be useful for such applications as differential absorption LIDAR (DIAL) and sum frequency generation. Early demonstrations of multifrequency devices concentrated on pulsed dye lasers, see for example H. S. Pilloff, "Simultaneous Two-Wavelength Selection in the $N_2$ Laser Pumped Dye Laser," *Applied Physics Letters*, Vol. 21, pp. 339-340, 1972; C. Wu and J. R. Lombardi, "Simultaneous Two-Frequency Oscillation in a Dye Laser System," *Optics Communications*, vol. 7, pp. 233-236, 1973; H. Lotem and R. T. Lynch, Jr., "Double Wavelength Laser," *Applied Physics Letters*, Vol. 27, pp. 344-346, 1975. The technique of using a dye laser in a pulse mode for simultaneous operation is both cumbersome and complicated and gives rise to numerous problems. For example, the gain medium lifetime is fairly short, requiring frequent changes of dye and solvent. Dye solvents are often flammable and dyes themselves are generally carcinogenic. In addition, the techniques used to generate simultaneous multifrequency operation in the pulse dye lasers use inefficient means to separate and tune the wavelengths and these techniques therefore are not suitable for CW operation. The titanium-doped sapphire (Ti:sapphire) laser is a tunable laser that operates over the wavelength range of about 680 nanometers to about 1.1 microns and is ideally suited for a number of applications that previously had used dye lasers. The Ti:sapphire gain material is presently grown in very high quality and it has been shown to be an extremely efficient laser material. However, prior operation of the Ti:sapphire laser had been at only one frequency (or wavelength) at a time. Simultaneous multifrequency operation had not been demonstrated previously in the Ti:sapphire laser, and cw multifrequency operation had not been previously demonstrated in any tunable laser. It is to be noted that the terms "wavelength" and "frequency" as used in this patent are interchangeable. The relationship between the frequency $\nu$ and the wavelength $\lambda$ of optical radiation is given by the well-known equation $\lambda\nu=c$, where $c$ is the speed of light.

A U.S. Pat. No. 4,287,486, entitled "Laser Resonator Cavities with Wavelength Tuning Arrangements", by Ali Javan, discusses various means of using tunable gain media to obtain multifrequency operation where all wavelengths can emerge collinearly. Independent control of wavelength and spatial separation between wavelengths is provided. Javan's design is most appropriate for lasers that are either discharge pumped such as gas lasers or optically pumped from the side. The unique features of end pumping are not taken advantage of nor are they addressed in Javan's patent. In addition, although Javan shows an intracavity prism as a wavelength dispersive element, no attempts are made to collimate the beam through the prism in the laser resonator cavity and dispersion by that prism is therefore degraded. An apparent limitation in Javan's patent is that wavelength tuning is accomplished by use of a small aperture which may lead to unacceptably high diffraction losses for a cw pumped laser. If the aperture is made wider to reduce these losses, the laser bandwidth would increase and wavelength selectivity would be degraded. An additional apparent limitation is that the Javan laser does not operate naturally in the lowest order transverse mode so that a hard aperture must be inserted in the laser resonator cavity to achieve the low order spatial mode operation; but this aperture also would increase the passive loss of the laser resonator cavity to unacceptably higher levels for cw operation.

Thus, a continuing need exists in the state of the art for an operational cw multifrequency solid state laser having the laser resonator cavity mode focused at the gain element thereby providing for very high optical pump efficiency that may be efficiently end-pumped, is practical, contains a region where the laser resonator cavity mode is collimated thereby allowing optimal use of an intracavity prism used in a minimum deviation orientation, as well as allowing for insertion of birefringent wavelength tuning elements and intracavity etalons for line narrowed operation, and is readily tuned such as by independent wavelength control at each wavelength by angular tuning of one mirror or by rotating the prism to permit the simultaneous scanning of all wavelengths while the separation between the wavelengths is maintained constant when pumped with suitable optical means.

OBJECTS OF THE INVENTION

Accordingly, an object of the invention is to provide a tunable solid state laser which can operate at more than one wavelength simultaneously over a preselected wavelength range.

Another object of the invention is to provide a tunable solid state laser having the capability of operating at two or more wavelengths simultaneously in which each wavelength can be tuned independently of the other.

Another object of the invention is to provide a tunable solid state laser which is capable of operating at two or more wavelengths simultaneously and in which these wavelengths can be tuned or changed simultaneously while keeping the wavelength separation between them constant over a preselected range of wavelengths.

Another object of the invention is to provide a tunable solid state laser which allows a low gain laser transition to oscillate in the laser resonator cavity simultaneously with a much higher laser gain transition.

Another object of the invention is to provide a tunable solid state laser which operates sequentially at two or more wavelengths.

Another object of the invention is to provide a tunable solid state laser which operates at two or more frequencies simultaneously and lases in the lowest order spatial transverse mode at both wavelengths over a preselected wavelength range.

Another object of the invention is to provide a tunable solid state laser which produces two or more frequencies simultaneously in a collimated output beam in which all output frequencies propagate collinearly outside of the laser resonator cavity.

Another object of the invention is to provide a tunable CW argon ion laser pumped Ti:sapphire laser which produces laser emission at two or more wavelengths simultaneously between 680 nanometers and 1.1 microns.

Another object of the invention is to provide a tunable solid state laser which operates at two or more wavelengths simultaneously and in which part of the laser resonator cavity mode is collimated, allowing the use of a birefringent tuning element to determine the wavelengths that are simultaneously achieved.

Another object of the invention is to provide a CW tunable solid state laser which operates at two or more wavelengths simultaneously and in which the laser resonator cavity mode contains a collimated region and in which a dispersive prism can be placed in a minimum deviation configuration.

Another object of the invention is to provide a tunable solid state laser which operates at two or more wavelengths simultaneously and which allows wavelength selection by angular rotation of one or more end mirrors.

Another object of the invention is to provide a tunable solid state laser which operates at two or more wavelengths simultaneously and which provides for wavelength tuning by rotating an intracavity Brewster angle prism oriented for minimum deviation.

Another object of the invention is to provide a line narrowed tunable solid state laser which produces simultaneous CW output at two or more frequencies, the bandwidth of each frequency being substantially narrowed by the insertion of intracavity narrowing elements.

Another object of the invention is to provide a solid state tunable laser which operates at two or more wavelengths simultaneously and in which the laser resonator cavity mode contains a region where the various wavelengths are spatially separated, and further containing another region where all the wavelengths simultaneously propagate collinearly and are spatially superimposed.

These and other objects of the invention will become more readily apparent from the ensuing specification and drawings when taken in conjunction with the appended claims.

SUMMARY OF THE INVENTION

The present invention is directed to providing a tunable solid state laser. A resonator is made up of two or more end reflective elements, two curved fold mirrors, and a output coupler reflective element to form a reflective path and define a laser resonator cavity. A laser crystal is disposed in the reflective path in the laser resonator cavity and a means for optically exciting the laser crystal is appropriately disposed to end pump the laser crystal to produce a laser emission in a preselected range of wavelengths. An element for wavelength dispersion such as a prism is disposed in the reflective path in the laser resonator cavity between one fold mirror and the end reflective elements for tuning the laser emission to at least one desired wavelength in the preselected range of wavelengths. The two curved fold mirrors focus the laser resonator cavity mode energy within the laser crystal. These mirrors also serve to collimate the laser resonator cavity mode in other regions of the laser resonator cavity. The laser resonator cavity mode is collimated as it passes through the prism to optimize the wavelength dispersion performance of the prism.

The tunable solid state laser can further include elements for line narrowed operation at one or more wavelengths, and shutters, apertures or the like to prevent operation temporarily at one or more wavelengths. By end pumping the laser crystal, a "gain aperture" is created in the laser crystal which allows the laser to operate only at the lowest order spatial transverse mode at the desired wavelengths in the preselected range of wavelengths. The design of the laser resonator cavity provides spatial separation of the various wavelengths operating simultaneously in one part of the laser resonator cavity and yet provides collinear superposition of all the laser wavelengths in another part of the laser resonator cavity. The tuning element can be a Brewster angle dispersive prism placed in minimum deviation or a birefringent tuner operated at Brewster's angle.

DETAILED DESCRIPTION OF THE PREFERRED EMBODIMENTS

This inventive concept involves the implementation of an optical laser resonator cavity that will allow simultaneous CW laser oscillation at two or more laser wavelengths. The design of the optical laser resonator cavity disclosed herein is generic and could be used either in laser systems with several fixed wavelength transitions such as Nd:YAG where the 1.064 micron transition operates simultaneously with laser lines at 1.32, 1.34, 1.36, 1.42, 1.44 and 0.942 microns, or in other continuously tunable laser systems such as Cr,Tm:YAG which tunes between about 1.9 and about 2.1 microns or an alexandrite laser which tunes between approximately 720 and 840 nanometers. Other exemplary laser systems are:

Cr:LiCAF which can be tuned between about 720 nanometers and 850 nanometers;

Cr:LiSAF which can be tuned between approximately 760 nanometers and 1 micron;

Cr:LiSGAF which can be tuned between approximately 800 nanometers and 900 nanometers;

Tm:YAG which can be tuned between about 1.87 microns and about 2.16 microns;

Tm:YSGG which can be tuned between about 1.85 microns and about 2.14 microns;

Tm:GSGG which can be tuned between about 1.92 microns and about 2.04 microns;

Ho:YAG which can be tuned between about 2.05 microns and about 2.15 microns, and between about 2.84 microns and about 2.92 microns; and Er:YAG which can be tuned between about 2.7 microns and about 2.96 microns.

The optical laser resonator cavity can be resonantly pumped or flash pumped. The wavelength range over which the laser system operates is determined by the dopant or dopants used in the laser crystal, as well as by the reflective coatings and transmission of the optical elements in the laser resonator cavity. As discussed above, some of the exemplary dopants that can be used in the laser crystals are $Er^{3+}$, $Ho^{3+}$, $Nd^{3+}$, $Cr^{3+}$, $Ti^{3+}$, and $Tm^{3+}$. In addition, other activator ions which can be used are various ones of divalent ($Mn^{2+}$, $Co^{2+}$ and $Ni^{2+}$) and quadrivalent ($Cr^{4+}$ and $V^{4+}$) transition metal ions; trivalent actinides ($U^{3+}$); and divalent rare earth ions ($Sm^{2+}$, $Tm^{2+}$ and $Eu^{2+}$).

Figure 1A:
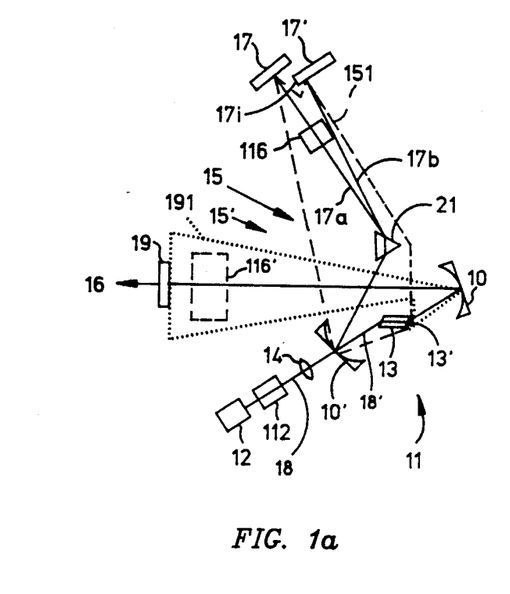
FIG. 1a illustrates a first embodiment of the invention.

Referring now to the drawings, wherein like reference numerals designate identical or corresponding parts throughout the several views, FIG. 1a illustrates a first embodiment of a tunable solid state laser 11. The tunable laser-pumped solid state laser includes a laser rod or crystal 13 disposed in a resonator 15' defined by optically-aligned end reflective elements or mirrors 17 and 17', concave fold reflective elements 10 and 10', and an output coupler reflective element mirror 19 in a reflective path in a laser resonator cavity 15. For ease of understanding of the invention, tunable solid state laser 11 of FIG. 1a is described in terms of a tunable solid state laser pumped by an argon ion laser 12 having a laser rod or crystal 13 of an exemplary $Ti^{3+}$-activated sapphire host material to produce a laser beam or emission which can be tuned within the wavelength range of about 700 nanometers to 850 nanometers. It should, however, be remembered that a different wavelength range can be realized by utilizing different reflective coatings on optical elements 17, 17', 10, 10', and 19, or by utilizing a laser crystal 13 which contains one or more different dopants and different associated optical elements. As an aid for understanding the invention, tunable solid state laser 11 of FIG. 1a will be described in terms of operating at two frequencies simultaneously. It is to be understood that three or more simultaneous wavelengths are able to be produced by using additional appropriately disposed high reflective end elements that provide feedback through the prism 21 to the laser crystal 13.

Mirrors 17 and 17' are highly reflective while the mirror 19 is partially transmissive to a laser wavelength of approximately 700 to 850 nanometers to provide the output coupling for the laser emission within the wavelength range from about 700 nanometers to 850 nanometers from tunable laser 11. A dispersive Brewster angle prism 21 is inserted into laser resonator cavity 15 between the fold mirror 10' and the end reflective mirrors 17 and 17'. Feedback path 17a is spatially separate from feedback path 17b between prism 21 and highly reflective mirror 17. Similarly, feedback path 17b is spatially separate from feedback path 17a between prism 21 and highly reflective mirror 17'. Feedback along path 17a may be at a substantially different wavelength than feedback along path 17b.

Argon ion laser 12 produces a pumping mode output. The pump laser output polarization, rotated by polarization rotation optics 112, produces a collimated beam 18 that is focused into a focussed pumping beam 18' (see FIG. 1c) by a 25 centimeter lens 14 onto Ti:sapphire crystal 13. The pumping of the laser crystal 13 is end pumped to improve the energy conversion efficiency, particularly, when the pumping mode is oriented and focussed for mode overlap as disclosed herein. The apparatus for end-pumping the laser crystal 13 consists of pump laser 12, polarization rotation apparatus 112, and lens 14. In addition, a concave fold mirror 10' should not be plano-concave as is typically used for concave laser mirrors. Instead, the mirror should be concave-convex where the absolute value of the radii of curvature of both mirror surfaces are the same. This is commonly referred to as a "meniscus" lens. This type of mirror substrate is desirable for high efficiency end-pumping since in conjunction with the proper selection of the focal length and position of focusing lens 14, it will provide virtually no distortion to the focused end pumping beam 18' (depicted in FIG. 1c) as the beam passes through concave fold mirror 10'. This will be true only when the radius of curvature of the focused pump beam matches the absolute value of the radii of curvature of both surfaces of the meniscus mirror 10'.

Figure 1B:
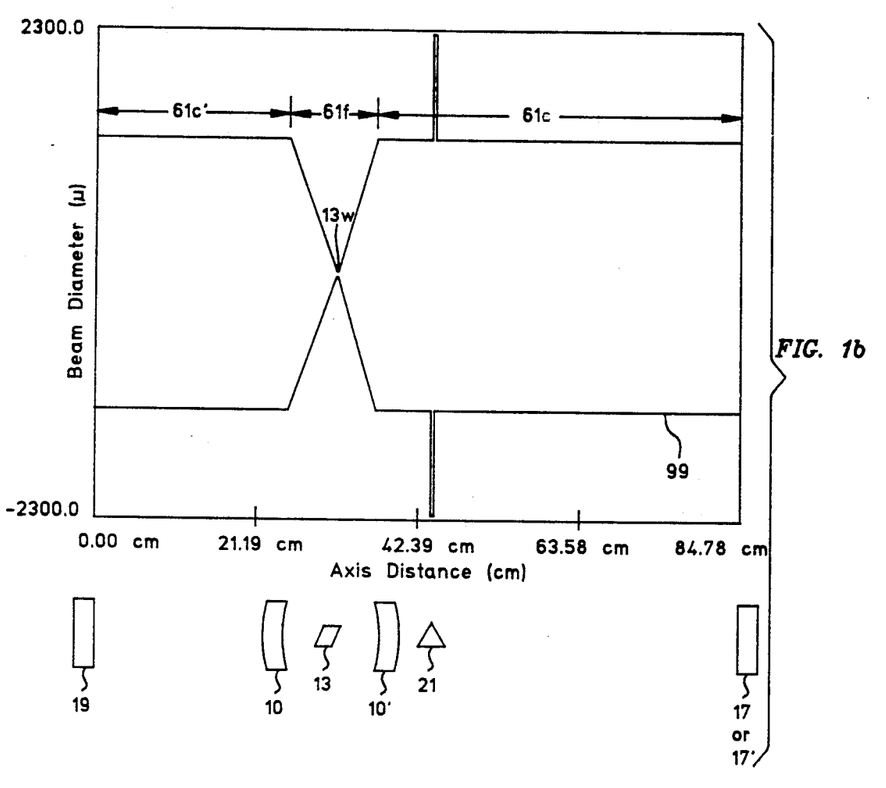
FIG. 1b illustrates the shape of the laser resonator cavity mode in the first embodiment of the invention with the constituent elements of the resonator appropriately located and spaced to create the shape of the resonator cavity mode, but for reasons of clarity the size of each constituent element is not shown to scale.
Figure 1C:
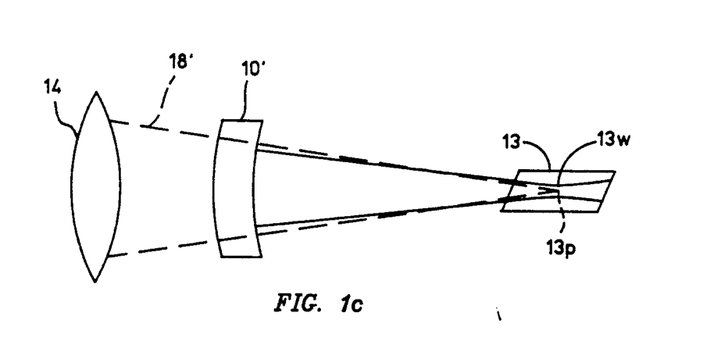
FIG. 1c illustrates the details of end-pumping the Ti:sapphire laser crystal through one of the fold mirrors.

Referring to FIGS. 1b and 1c, laser resonator cavity mode waist 13w is adjusted to be located approximately in the center of Ti:sapphire laser crystal 13. Focused pump laser beam 18' is adjusted so that the focused pump waist 13p is approximately co-located with laser resonator cavity mode waist 13w at about the center of the laser crystal. The diameter of the pump waist and laser resonator cavity waist can be made approximately equal by proper selection of the focal length of lens 14 and the spacing between concave fold mirrors 10 and 10'. Matching the two waists 13w and 13p in size and position in general leads to the best pump and output efficiency for tunable laser 11.

Dispersive Brewster angle prism 21 is oriented for minimum deviation to provide the least amount of astigmatism within the laser resonator cavity, and its faces are uncoated and oriented at Brewster's angle with respect to the laser resonator cavity mode. The prism material is a highly dispersive glass typical of the glasses that compose Faraday rotators, and the glass is chosen specifically to have minimum absorption over a preselected range of wavelengths. Suitable materials for the prism are commercially available and may include such glasses as Kigre Corporation M-16 glass and Schott glass SF 55.

Concave fold mirrors 10 and 10' are provided with 10 centimeter radii of curvature that are used to concentrate the laser resonator cavity mode in crystal 13, which is a 2-centimeter-long Ti:sapphire crystal having Brewster angle faces. This is shown in FIG. 1b. Note that refraction of the laser resonator cavity mode and the pump mode at both faces of crystal 13 has not been accurately depicted in FIG. 1c to avoid unnecessary complications in the drawings. The two concave fold mirrors are provided with broadband high reflector coatings over the range of 670 to 850 nanometers.

Two flat highly reflective (HR) mirrors 17 and 17' also were broadband coated to be highly reflective from 670 nanometers to 850 nanometers while output coupler 19 was appropriately treated to be approximately 95 percent reflective in this range.

The laser resonator cavity mode 99 is collimated in two regions of the laser resonator cavity as it extends between the elements of the resonator as shown in FIG. 1b. Collimation is effected by proper selection of the radii of curvature of fold mirrors 10 and 10', selection of the proper spacing between mirrors 10 and 10', and the use of flat reflective surfaces for mirrors 17, 17' and output coupler 19. The first collimated region 61c extends from flat reflective elements 17 and 17', through prism 21, to fold mirror 10'. The other collimated region 61c' extends from output coupler 19 to fold mirror 10. The Brewster angle prism is placed in collimated region 61c of the laser resonator cavity near fold mirror 10' to improve the wavelength resolution at mirrors 17 and 17'.

Independent tuning of each output wavelength is obtained by angular adjustment of each flat mirror 17 or 17'. The resulting tuning occurs only at the wavelength which is being fed back through prism 21 by the particular mirror that is being rotated. For example, rotating mirror 17 about the axis perpendicular to the plane of FIG. 1a will feed back a different wavelength to prism 21 along path 17a but will not affect the feedback wavelength of mirror 17'. Alternatively, the prism can be rotated to tune both wavelengths simultaneously. In tuning the output wavelengths with the prism the wavelength separation between the two output wavelengths is held constant while the individual wavelengths change simultaneously. Two separate feedback paths through the prism are provided by the pair of highly reflective end elements, mirrors 17 and 17'. The prism is typically oriented with respect to mirrors 17 and 17' so that the peak emission wavelength at 780 nanometers is beyond the interior edge 17i of the "red" mirror 17'. Mirror 17' is termed "red" because this mirror receives the longer wavelength of the two wavelengths.

The terms "red" and "blue" as used herein are relative terms. Specifically, "red" refers to the longer wavelength, while "blue" refers to the shorter wavelength. Similarly, when used as adjectives, "red" and "blue" refer to optical components or other entities involved in the generation or resonance of the longer or shorter wavelength, respectively. Therefore, the "blue mirror" is a mirror that reflects the shorter wavelength, while the "red mirror" is a mirror that reflects the longer wavelength. Implicit in the use of these terms is that only two wavelengths are being compared.

Alignment of the optics proceeds by adjusting the red mirror to produce a wavelength just to the red of the peak output. Mirror 17' is then translated perpendicular to its normal to position this first feedback axis as close to the interior edge 17i as possible to allow HR flat mirror 17, also called the "blue" mirror, to be inserted behind and to the side of the red mirror such that the axis for this second feedback path just clears the edge of the red mirror. Mirror 17 is adjusted to produce wavelengths to the blue of the peak wavelength. With this arrangement the resulting dual frequency output is emitted from the laser resonator cavity in a single collinear beam 16.

To demonstrate collinearity of the two output wavelengths in output beam 16, the output was expanded and the spatial superposition of the two wavelengths was verified by blocking one of the HR flats 17 or 17' and detecting the position of the remaining wavelength with a digitizing charge-coupled device (CCD) detector. A more sensitive measure of collinearity was obtained by translating pump beam 18 across the face of the Ti:sapphire crystal 13 and observing the simultaneous, correlated intensity variation for each wavelength. This verified that both feedback paths utilize a common active volume in the laser crystal. Argon ion laser 12 pump output level of 4.5 Watts was maintained for all measurements. The pump laser output polarization was rotated by polarization rotation optics 112 and focused onto the Ti:sapphire crystal 13 with a 25 centimeter lens 14. The output wavelengths were monitored using a 0.3 meter spectrometer in conjunction with an optical multichannel analyzer. A coarse, 100-line-per-millimeter grating was used in first order, providing a range of approximately 400 nanometers for the 512 element optical multichannel analyzer. This allows simultaneous display of both wavelengths.

Figure 2:
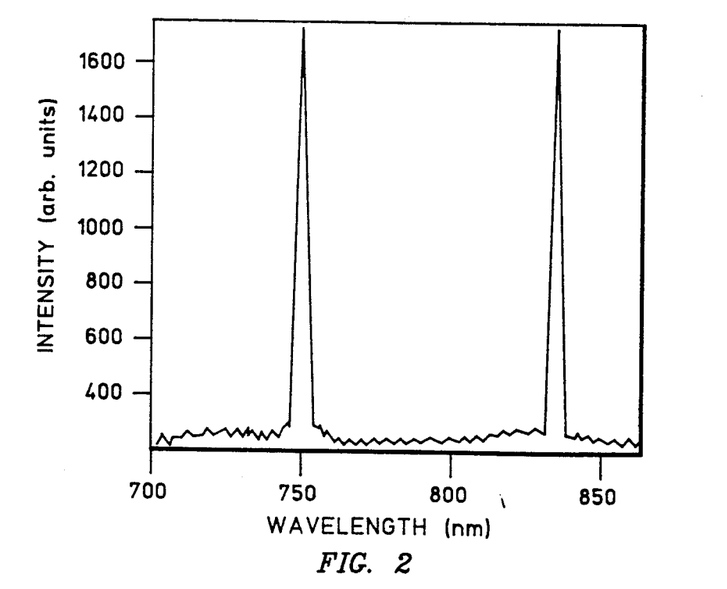
FIG. 2 illustrates a sample spectral output for simulataneous dual frequency operation.

A sample trace of dual wavelength operation recorded by the before-mentioned spectrometer and optical multichannel analyzer is shown in FIG. 2. The range of frequencies over which simultaneous multifrequency operation can occur in a homogeneously broadened laser is determined primarily by gain competition. This can be more fully understood by noting that in a tunable laser with a single feedback path containing no frequency selective or bandwidth narrowing intracavity elements, the output consists of a band of frequencies centered near the peak of the net gain curve. The net gain of a laser is the gain minus the loss. The spectral bandwidth of the untuned laser is determined by gain competition among resonant longitudinal modes. Injecting a resonant signal at a second wavelength which is within the tuning range of the laser will not result in partial locking (or equivalently, dual frequency operation) if the net saturated gain at the second wavelength is below threshold, see, for example, the paper titled "Laser Injection Locking" by C. J. Buczek, R. J. Freiberg and M. L. Skolnick in the *Proceedings of the IEEE*, Vol. 61, pp. 1411-1431, 1973. In fact, since the second wavelength is resonant in the free-running laser it would be emitted in the untuned device in any event were it not for gain saturation at the peak of the net gain curve.

With regard to the dispersed doubly-resonant laser embodiment shown in FIG. 1a, when one feedback path provides operation near the peak of the gain curve, the gain clamps near threshold and frequencies for which the net gain is substantially lower will not oscillate. Single wavelength operation will therefore be produced even though there is feedback for a second wavelength. This simple interpretation of dual frequency dynamics in a CW tunable laser provides a qualitative framework to explain much of the performance data obtained for the doubly resonant laser of FIG. 1a.

Figure 3:
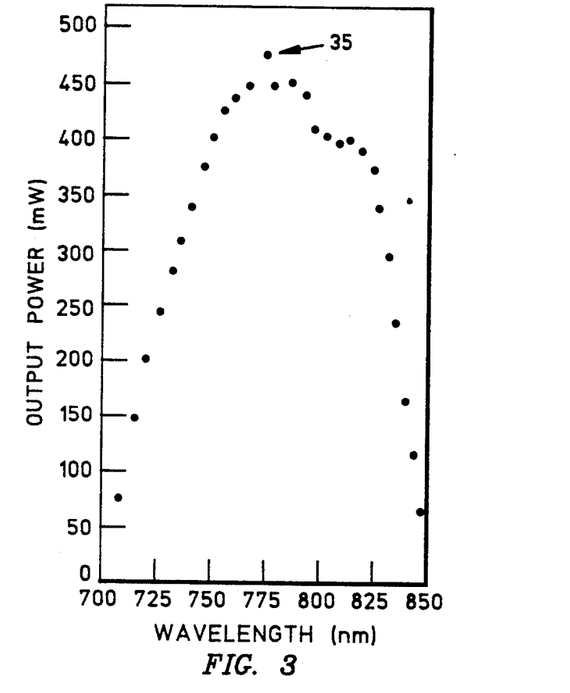
FIG. 3 illustrates a single wavelength tuning range of the Ti:sapphire laser.

By removing one of the HR flats 17 or 17', the laser operates as a single wavelength device. The spectral dependence of the power in the single wavelength laser is shown in FIG. 3. The maximum power obtained with the prism in the laser resonator cavity was 460 milliwatts at 780 nanometers, indicated by 35 in FIG. 3, but the peak was broad and the power near the maximum was maintained over the range of 770 to 790 nanometers. The laser power as a function of wavelength is an indication of the spectral dependence of the net gain of the laser.

As a dual wavelength laser, the total power was a more complicated function of wavelength owing to gain competition between the two operating frequencies. The total power obtained ranged from 80 milliwatts for data pairs where both wavelengths were in the wings of the tuning curve shown in FIG. 3 to 350 milliwatts for wavelength pairs near the peak.

Figure 4:
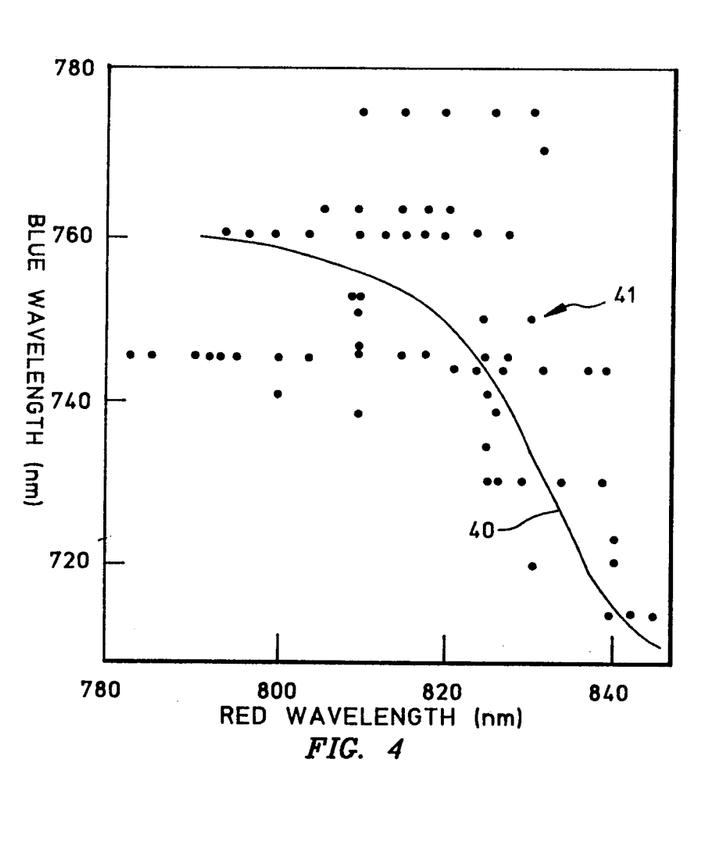
FIG. 4 illustrates the wavelength pairs produced simultaneously with the Ti:sapphire laser using the intracavity optical elements that were used to obtain FIG. 3.

FIG. 4 shows a sampling of wavelength pairs for which simultaneous dual frequency operation was achieved. Each dot on FIG. 4 indicates that cw simultaneous laser output was achieved at the corresponding red wavelength and blue wavelength indicated on the abscissa and ordinate, respectively. For example, FIG. 2 depicts simultaneous cw output at approximately 750 and 830 nm. Dot 41 in FIG. 4 represents this wavelength pair. Since the mirror coatings typically do not extend to the edges of the HR flats there was some "dead space" in the wavelength tuning curve of the laser which was approximately 10 nanometers. However, it is to be noted that it is possible to obtain laser coatings on mirrors which extend directly to the edge of the mirror. In addition, by the insertion of intracavity deflectors, such as a toroidal mirror such as those occasionally used in commercial ratiometers, or a front surface coated prism, it is possible to deviate the two wavelength paths shown in FIG. 1a substantially and have them impact the center of mirrors 17 and 17'. This is the arrangement shown in FIG. 5a which is a modification of FIG. 1a, where coated right angle reflective prism 50 deflects wavelength dispersed feedback paths 17a and 17b to highly reflective flat elements 17 and 17', respectively. More coated right angle reflective prisms could be interposed, not shown in FIG. 5a, to provide separation for additional wavelengths, if desired.

Figure 5A:
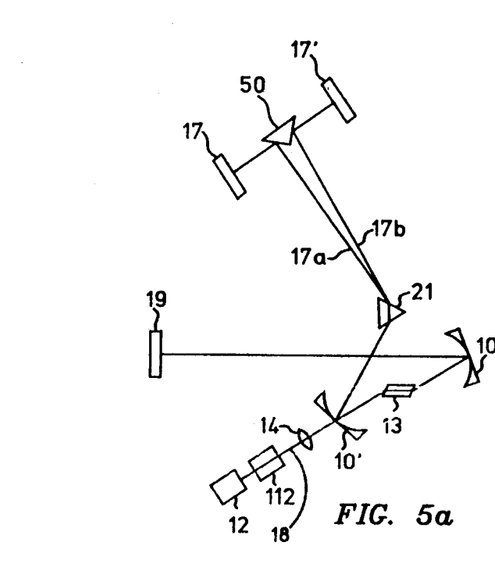
FIG. 5a illustrates a second embodiment of the invention having a front surface coated right angle reflective prism to deflect the wavelengths.
Figure 5B:
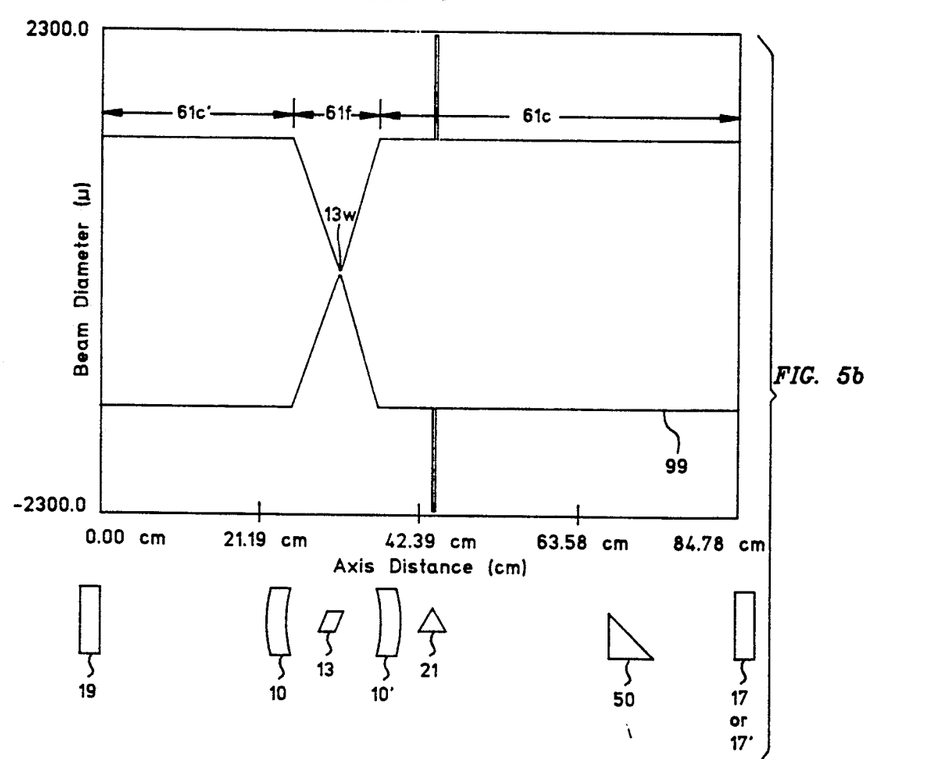
FIG. 5b illustrates the shape of the laser resonator cavity mode in the second embodiment of the invention with the constituent elements of the resonator appropriately located and spaced to create the shape of the resonator cavity mode, but for reasons of clarity the size of each constituent element is not shown to scale.

There are two mechanisms that tend to limit the tuning range for dual frequency operation. The first is the gain competition discussed earlier which prevents operation at two frequencies when the net gain of one is substantially lower than that of the other. As a consequence, the highest concentration of data points shown in FIG. 4 is near the locus of wavelength pairs for which the measured single wavelength output is equal. This is indicated by the solid line 40 in FIG. 4. There are only a few points near the 780 nm peak of the net gain curve (35 in FIG. 3) for the same reason. The other limiting mechanism is a result of geometric constraints associated with the two feedback paths. When tuning with only the feedback mirrors 17 and 17' (in which case the prism 21 is fixed) the tuning range of the red mirror cannot be extended to the blue past the wavelength where the dispersed frequencies lie beyond the interior edge of the coating. This process is known as walkoff. Similarly, the red wavelength limit for the blue mirror is determined by the mirror angle at which the edge of the red mirror blocks the blue mirror feedback. This process is known as vignetting. Translation of HR flat 17 transverse to mode axis 17a, and translation of HR flat 17' transverse to mode axis 17b, as well as angular rotation, are required to produce the range of wavelength operation shown in FIG. 4. But in several instances vignetting or walkoff bounded the operating range. It is to be noted again that changes in the laser resonator cavity configuration such as the insertion of a front surface coated prism 50 as shown in FIG. 5a will reduce the problems associated with vignetting and walkoff. Prism 50 deflects wavelength paths 17a and 17b, to approximately form a 180 degree angle and will extend the tuning range and eliminate the dead space when geometric constraints would otherwise define the limit.

The dual wavelength operating range shown in FIG. 4 is determined primarily by gain competition. This range was extended by inserting an intracavity mechanical Q-switch 116' as shown in FIG. 1a. Although the switching rate was 3 KHz, which is relatively low compared to the upper laser level lifetime of approximately 3 microseconds, the resulting increase in gain was enough to extend the wavelength range over which simultaneous dual frequency emission was observed by approximately 10 nanometers. In such a manner it is possible to obtain simultaneous dual frequency operation in a CW pumped laser where the output is in a pulsed mode. By Q-switching it was also possible to observe the temporal evolution of emission at each of the two wavelengths. It was found that temporal superposition of the two wavelength pulses occurred only when there was spatial superposition of each feedback path in the laser crystal.

Figure 6:
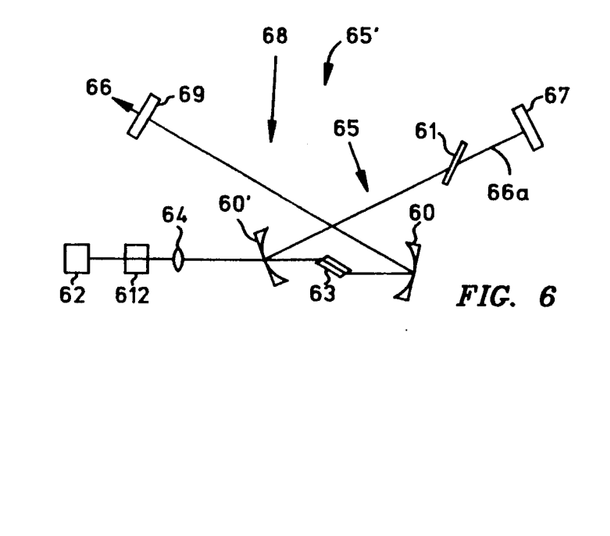
FIG. 6 illustrates a third embodiment of the invention.

Another embodiment of the inventive concept is shown in FIG. 6. In this embodiment a tunable solid state laser 68 uses a single high reflective flat mirror 67 and a birefringent tuner 61 to obtain simultaneous cw operation at two wavelengths. The birefringent tuner is designed with a free spectral range that is smaller than the net gain bandwidth of the laser. The free spectral range of the birefringent tuner is similar to that of an etalon, for example, and is the wavelength range between transmission orders. The birefringent tuner rotates the polarization of a given wavelength $\lambda_1$ $(m+\delta)$ waves, where m is an integer that is called the transmission order. When used in the manner shown in FIG. 6, maximum transmission will occur when $\delta$ is 0. There will also be a wavelength $\lambda_2$ for which the polarization rotation is $(m-1)$ waves, and a wavelength $\lambda_3$ for which the polarization rotation is $(m+1)$ waves. The absolute difference between $\lambda_1$ and $\lambda_3$, or alternatively $\lambda_1$ and $\lambda_2$, is the free spectral range of the birefringent tuner.

When the free spectral range, as described above, is narrower than the net gain bandwidth of the laser, two or more transmission peaks will occur in the wavelength range over which the laser can operate. The birefringent tuner 61 is inserted in laser resonator cavity 65 defined within a resonator 65' made up of the elements flat mirror 67, concave fold mirrors 60 and 60' and output coupler 69. The laser resonator cavity extends from mirror 67 to mirror 60' to mirror 60 to output coupler 69. The birefringent tuner is oriented at Brewster's angle with respect to resonator mode axis 66a between fold mirror 60' and highly reflective mirror 67. End pumped laser crystal 63 is disposed in laser resonator cavity 65 between fold mirrors 10 and 10'. The birefringent tuner 61 may be a stack of one or more exemplary birefringent quartz plates or birefringent tuner plates (not shown) oriented at Brewster's angle to the resonator mode axis 66a of the laser resonator cavity mode in laser resonator cavity 65. Each of the birefringent plates of the tuner 61 has an optic axis (not shown) which lies in the plane of the birefringent tuner or birefringent plate and is aligned in parallel with each of the optic axes of the other birefringent plates. Tuning of birefringent tuner 61 is accomplished by rotating its plates simultaneously about an axis normal to the plane of each plate in tuner 61.

The maximum primary transmission peak of an individual birefringent plate occurs at a wavelength given by $$\lambda = \frac{(n_0 - n_e)t}{(\sin\beta)m}(1 - \cos^2\beta\sin^2\alpha) \quad (1)$$

where:

$n_o$ and $n_e$ are the respective ordinary and extraordinary indices t is the plate thickness $\beta$ is Brewster's angle m is an integer, and $\alpha$ is the angle between the fast axis of the birefringent plate and the s (high loss) polarization of the Brewster surface.

The free spectral range of birefringent tuner 61 is determined by the thinnest plate in the tuner 61. In general, the thickness of the thinnest plate is selected such that the desired tuning range of laser 68 falls in the following range of alpha values:

$$10° \leq \alpha \leq 80°. \quad (2)$$

Additional plates in birefringent tuner 61 with thickness values which are integral multiples of the thinnest plate are added to birefringent tuner 61 to obtain the desired resolution bandwidth of the primary transmission peak. The bandwidth of an individual plate is proportional to the quantity $[(n_o - n_e)t]^{-1}$. Thus, the addition of thicker plates to birefringent tuner 61 reduces its final bandwidth.

Figure 7:
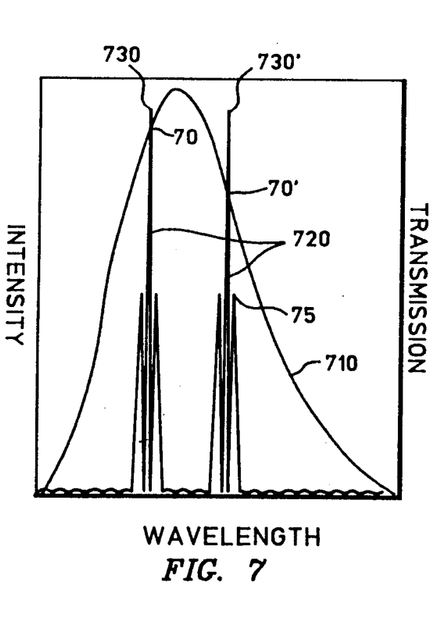
FIG. 7 illustrates the spectral tuning curve of a tunable laser and the transmission curve of a birefringent tuner.

The requirement that the free spectral range of the birefringent tuner be narrower than the net gain of the laser requires selection of the plate thicknesses such that more than one transmission peak occurs within the bandwidth of the tuning preselected range of wavelengths. Noting FIG. 7, curve 710 indicates in a general manner the spectral dependence of the tunable laser output intensity fabricated in accordance with this inventive concept. Curve 720 indicates the transmission as a function of wavelength for a birefringent tuner such as tuner 61. Primary peaks 730 and 730' correspond to 100% transmission for the birefringent tuner and are referred to as primary transmission maxima. The spectral separation between peaks 730 and 730' is determined by the thickness of the thinnest plate in the tuner and is termed the free spectral range of the birefringent tuner. If the birefringent tuner is designed so that peaks 730 and 730' are separated by less than the bandwidth of curve 710, then it is possible to rotate the birefringent tuner about the axis normal to the plane of the birefringent plates such that transmission peaks 730 and 730' pass wavelengths that correspond to approximately equal output intensity points, such as indicated by 70 and 70' in FIG. 7. In this manner, simultaneous two wavelength operation can be achieved at wavelengths corresponding to points 70 and 70' on curve 710. It is important to note that once a birefringent tuner is designed, the tunability range over which simultaneous two wavelength operation may be achieved is limited in general to a range of approximately 10 nm for each wavelength of the wavelength pair.

The requirement that the thickness of additional plates be integral multiples of the thinnest plate of the birefringent tuner 61 insures that the primary transmission peak or maximum of each plate occurs at the same wavelength. Thus, the transmission function of the entire assembly of plates in the birefringent tuner 61 will be a convolution of the transmission function of the individual plates, with the tuning rate determined by the free spectral range of the thinnest plate and the resolution bandwidth determined by the combination of all of the plates in tuner 61, see for example A. L. Bloom, "Modes of a laser resonator containing tilted birefringent plates" *Journal of the Optical Society of America*, Vol. 64, pp. 447-452, 1974.

In general, birefringent tuners are designed to have only one primary transmission peak within the net gain bandwidth of an operating tunable laser. This prevents operation at a second wavelength which is generally considered undesirable. However, the occurrence of a second primary transmission maximum at a wavelength separated from the first primary transmission maximum by an amount less than the bandwidth of the tunable laser (the separation of primary maxima is known as the free spectral range) is an essential feature in the embodiment shown in FIG. 6 for obtaining multifrequency operation of the tunable laser. Such additional primary transmission maxima occur for modes or wavelengths in which the total phase retardation of the entire stack of birefringent plates of birefringent tuner 61 corresponds to an integral number of half or full waves. This situation results in reduced reflection losses from Brewster surfaces in laser resonator cavity 65. Each birefringent plate contains two surfaces at Brewster's angle, and laser crystal 63 contains two additional Brewster surfaces. For the purposes of this inventive concept, second or additional primary maxima occur with transmission peaks of 100 percent. This is to be distinguished from subsidiary maxima such as 75 in FIG. 7 which are typical of all birefringent tuners and can be predicted by the Jones matrix calculations for transmission through a birefringent tuner. Second primary maxima are distinguished from the first primary maxima in a nominal sense and are identical to, or repetitions of, the primary maximum at higher and lower wavelengths.

Over 670 milliwatts was obtained at 780 nanometers by using an exemplary three-plate birefringent tuner 61. Dual frequency operation was obtained with output at 720 and 830 nanometers and could be tuned over several nanometers by rotating the birefringent tuner by several degrees about the axis normal the plane of the birefringent plates. While this method of obtaining two frequencies produces higher output power and ensures that the two wavelengths will be emitted collinearly, it has the obvious limitation that after fabrication of the birefringent tuner the separation between the two wavelengths cannot be changed. As a consequence, the range for dual wavelength operation is limited.

Figure 8:
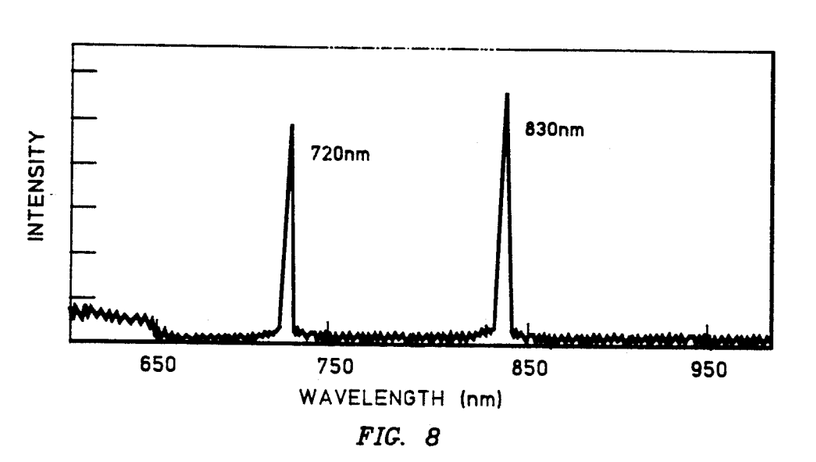
FIG. 8 illustrates dual wavelength operation of the Ti:sapphire laser using a birefringent tuner.

A sample spectrum of CW simultaneous two-wavelength operation using a birefringent tuner is shown in FIG. 8. The exemplary three-plate birefringent tuner used to obtain the data in FIG. 8 contained three plates, with thicknesses in the ratio of 1:2:9. The thinnest plate was approximately 0.5 mm thick, and the optic axis was in the plane of the plate.

Operation at only two wavelengths simultaneously using the birefringent tuner is the most straightforward manner of multifrequency operation. It is to be noted that the gain curve shown schematically in FIG. 7 can be altered to have two or more peaks within the free spectral range of the birefringent tuner simply by changing the spectral dependence of the reflectivity of the coatings on mirrors 60, 60', 69 and 67, over the preselected range of wavelengths for which operation is desired. In this case, three or more primary transmission maxima of the birefringent tuner can be chosen to coincide with three or more peaks in the gain curve and therefore one can obtain multifrequency operation of laser 68 at three or more frequencies. In this manner both the net gain curve and the birefringent tuner transmission curves are designed with a mutually consistent goal of obtaining the desired multifrequency operation.

Operation with a birefringent tuner 61 is achieved by monitoring the output wavelength for tunable solid state laser 68 shown in FIG. 6, while rotating the birefringent tuner about an axis normal to the plane of the birefringent tuner plates. This is done until simultaneous operation is observed at two wavelengths in the exemplary laser emission. As shown in FIGS. 6 and 8, an output 66 at 720 nanometers and 830 nanometers was achieved in the device that was tested, although other wavelength pairs could be obtained by redesigning the thickness of the plates and/or the angle that the optical axis makes with respect to the plane of the birefringent tuner plates. This latter angle is determined when the plates are manufactured and generally is between 0° and 45°.

Figure 9:
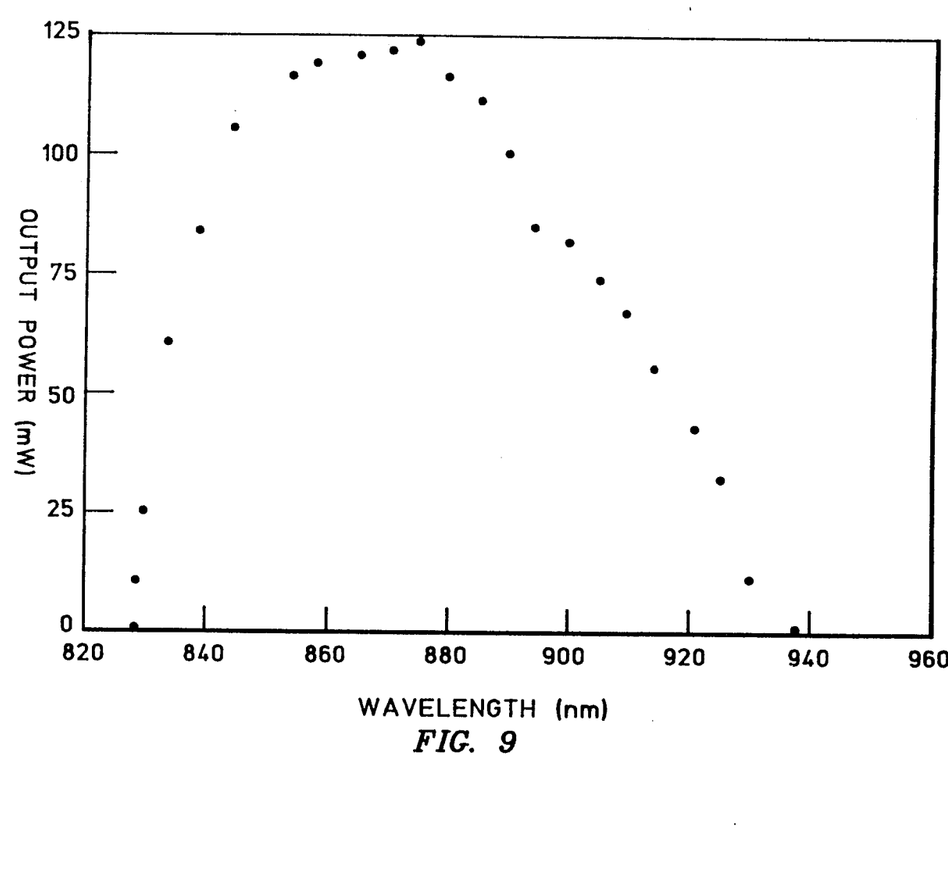
FIG. 9 illustrates another single wavelength tuning range of the Ti:sapphire laser.
Figure 10:
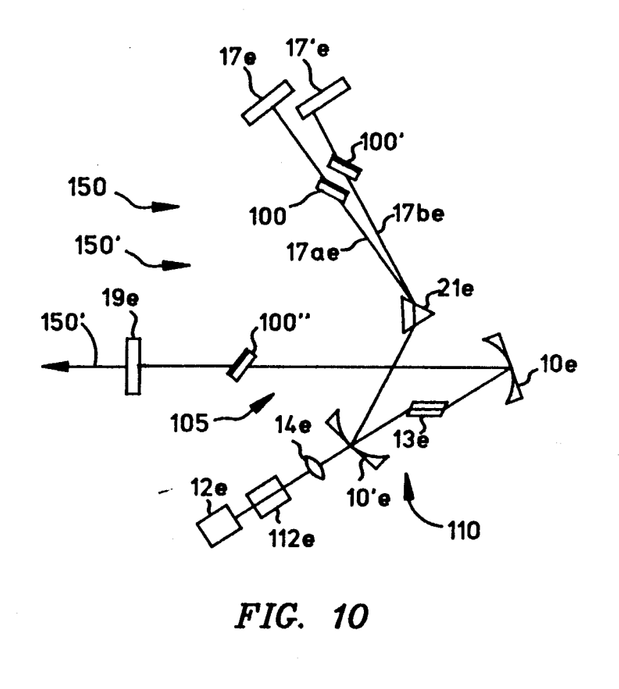
FIG. 10 illustrates a fourth embodiment of the invention.

Referring now to FIG. 10, to demonstrate spectral narrowing, two etalons (or equivalently, an etalon pair) were inserted into laser resonator cavity 150 of a solid state tunable laser 110. Reflective coatings that were shifted to the red relative to those used to obtain the spectral output curve in FIG. 3 were applied to highly reflective mirrors 17e, 17'e, concave fold mirrors 10e, 10'e, and output coupler 19e. As a consequence, the output operation was shifted to the red, as shown in FIG. 9. FIG. 10 depicts solid state tunable laser 110 with the red-shifted reflective coatings and shows that an etalon pair 100 or 100' may be placed either in path 17ae or path 17be, respectively, or an etalon pair 100" may be placed in the region between the concave fold mirror 10e and output coupler mirror 19e. An exemplary etalon pair is made up of one etalon 0.5 millimeters thick and another etalon 10 millimeters thick and was positioned as indicated by 100 in FIG. 10 to narrow the output at 864 nanometers in path 17ae. Etalon pairs 100' and 100" were not used. A resonator 150' defines laser resonator cavity 150 which extends from output coupler 19e to fold mirror 10e to fold mirror 10'e to HR flat 17e for the blue wavelength, or to HR flat 17'e for the red wavelength.

Figure 11A:
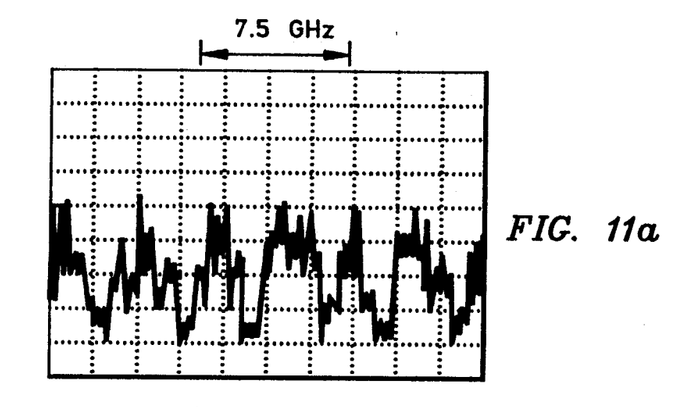
FIG. 11a illustrates broad band operation at 864 nm.
Figure 11B:
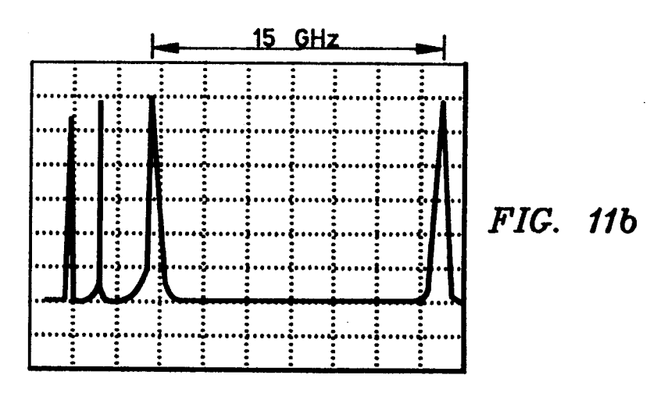
FIG. 11b illustrates line narrowed operation at 864 nm.

A Fabry-Perot interferometer was used to observe the spectral bandwidth of the laser emission. An example of the line narrowing achieved with laser 110 is shown in FIGS. 11a and 11b. In FIG. 11a, the Fabry-Perot analysis of the laser emission before insertion of the exemplary etalon pair shows multiple peaks in the region of 864 nm. More than one peak within the 7.5 GHz free spectral range of the Fabry-Perot indicates broadband operation. The free spectral range of the Fabry-Perot interferometer used to obtain the data of FIG. 11a is indicated in the figure. The output bandwidth before the insertion of the etalon pair was also measured using a spectrometer and is approximately 100 GHz. After insertion of etalon pair 100 in wavelength path 17ae, a Fabry-Perot interferometer with a free spectral range of 15 GHz was used to perform the analysis of laser emission 150' shown in FIG. 11b. The data indicate a single spectral peak for each free spectral range. The two peaks on the right of FIG. 11b represent the same spectral line, observed over two transmission orders of the Fabry-Perot. The two sharper peaks on the left side of FIG. 11b are simply "re-wind" transmission peaks. The Fabry-Perot is accurate as it scans only in the direction of increasing plate separation. Since it is a continuously scanning instrument, it must rapidly bring the plates back to their starting position before repeating a scan. During the rapid return sequence, the two rewind peaks appear.

Insertion of the exemplary etalon pair in arm 17ae reduced the output linewidth to 450 MHz without affecting operation at the second wavelength. The linewidth measurement was limited by the finesse of the interferometer and may in fact be narrower than 450 MHz. It was found that both output wavelengths contained in output 150' could be narrowed simultaneously by placing the etalon pair in the laser resonator cavity at position 100". It is important to recognize that operation of laser 150 with a reduced bandwidth is accompanied by higher efficiency than is generally obtained in a single wavelength standing wave laser since spatial hole burning is reduced owing to the simultaneous production of two wavelengths. This arises from the fact that the nodes of the standing wave for the first wavelength in general do not coincide with the nodes of the standing wave for the second wavelength. More efficient extraction of the inverted population is therefore possible. In addition, the threshold for multi-longitudinal mode operation at either wavelength will be higher than in a traditional standing wave laser. It should also be noted that effective use of etalons for line narrowing is only possible if the laser resonator cavity mode is collimated in the region where the etalons are inserted.

When using etalons in the laser resonator cavity 150 as shown in FIG. 10 for line narrowed operation, angular tuning of the etalons is required to reduce losses in the laser resonator cavity at the desired peak wavelength. The peak wavelength is determined by the position of a tuning prism 21e, the angular orientation of the etalons, and the angular orientation of HR flats 17e and 17'e. Other combinations of etalon thicknesses, finesse, and/or numbers of etalons may be selected as desired to change the bandwidth of the resulting laser emission. In this manner even narrower bandwidths may be achieved. The selection of the number and thicknesses of the etalons is particularly important when they are placed in the region where both wavelengths are collinear, namely, the region between fold mirror 10e and output coupler 19e.

The laser crystal in all the embodiments can have an exemplary laser host crystal (not shown) which is selected from a broad group of crystalline materials. Suitable materials include YAG (yttrium aluminum garnet), YSGG (yttrium scandium gallium garnet), GSGG (gadolinium scandium gallium garnet), GSAG (gadolinium scandium aluminum garnet), YSAG (yttrium scandium aluminum garnet), YALO (yttrium aluminum oxygen), GGG (gadolinium gallium garnet), YGG (yttrium gallium garnet), and LLGG (lanthanum lutetium gallium garnet). The laser crystal 13 can also be doped with different impurities including $Cr^{3+}$. Various hosts for the $Cr^{3+}$ ion are known and include alexandrite, LiCAF (lithium calcium aluminum fluoride), LiSAF (lithium strontium aluminum fluoride) and LiSGAF (lithium strontium gallium fluoride). Also, the crystal host material could be made up of mixtures or combinations of crystal materials. The chief characteristic or requirement of a selected host crystal material is that it must have the capability of easily accepting the dopant ion. The dopant $Cr^{3+}$ ions or $Ti^{3+}$ ions must go into the host crystal material without significantly distorting the lattice of the host crystal material so that the quality of the host crystal material remains high. It should be noted that the sapphire host for the $Ti^{3+}$ ion is aluminum oxide, $Al_2O_3$.

Mirror coatings are important for determining the net gain as a function of the wavelength for the laser. This is an important consideration when operation at two wavelengths is desired where the stimulated emission cross-sections for each wavelength is very different. As shown by the dots in FIG. 4, wavelength pairs where the net gain is approximately the same are the most likely pairs to operate simultaneously. The net gain curve can be tailored to obtain desired multifrequency operation at any two wavelengths by adjusting the mirror reflectivities at the two desired wavelengths to either reduce the net gain at a wavelength where the stimulated emission cross-section is much higher than the other, or to increase the net gain at a wavelength where the stimulated emission cross-section is much lower than the other. For the data shown in FIG. 2 the wavelength range over which the mirrors were highly reflective was 700 to 850 nanometers and provided the net gain curve shown in FIG. 3. However, selecting reflectivities for mirrors 17, 17', 10, 10' and 19 in FIG. 1a such that reflectivity is enhanced or degraded at other specific wavelengths will allow operation at wavelength pairs other than those shown in FIG. 4. For the data obtained in FIG. 4, mirrors 17, 17', 10 and 10' were highly reflective with a reflectivity of greater than 99.9 percent over the region of 680 to 850 nanometers. Output coupler mirror 19 had a reflectivity that was approximately 95 percent at 780 nanometers and gradually increased to 99.9 percent at both 700 nanometers and 850 nanometers. This gradual increase of reflectivity was desirable and necessary to compensate for the lower stimulated emission cross-section as the wavelength increased or decreased respectively from 780 nanometers. Thus, the mirror reflectivity for output coupler 19 is tailored to compensate for the variations in the gain as a function of wavelength. In a similar manner, any two wavelength pairs over the range for which laser crystal 13 can operate can be produced simultaneously by tailoring the spectral reflectivity of the optical elements. In the exemplary case of Ti:sapphire, the tuning range is 680 nanometers to 1.1 microns, and the reflectivity of flat output coupler 19, fold mirrors 10 and 10', and flat mirrors 17 and 17' of FIG. 1a can be tailored, for example, to achieve operation at wavelength pairs other than those shown in FIG. 4. Similarly, the spectral reflectivity of the reflective elements of other embodiments of this inventive concept can be chosen to provide multifrequency operation at any pair of wavelengths for which there is net gain.

Two salient features of the laser resonator cavity design shown in FIG. 1a must be reemphasized. The first is that the laser resonator cavity mode can be divided into two regions: one region 151 where the simultaneously operating wavelengths are spatially separated, and another region 191 where the simultaneously operating wavelengths are collinear. Region 151 where the wavelengths are spatially separated extends from the face of laser crystal 13, indicated as 13', to fold mirror 10' through prism 21 to HR flats 17 and 17'. Due to refraction in laser crystal 13, caused by the non-normal angle of incidence made by the laser resonator cavity mode axis with respect to the crystal face, there is dispersion within laser crystal 13. The dispersion caused by crystal 13 is small, however, and for practical purposes the region between prism 21 and HR flats 17 or 17' provides the greatest and most useable spatial separation between the wavelengths. The region 191 over which the two or more wavelengths are spatially collinear extends from the face of laser crystal 13, indicated as 13', to fold mirror 10 to output coupler 19.

Having the two distinct regions 151 and 191 in the laser resonator cavity, one where the wavelengths are spatially separate and the other where the wavelengths are spatially collinear, provides important benefits. In the region where the wavelengths are spatially separated, one wavelength can be modulated without affecting the other. This can be done, for example, by insertion of a shutter or an electro-optic or acousto-optic Q-switch 116 as shown in FIG. 1a. In addition, operation at one wavelength can be enhanced by insertion of amplifiers in paths 17a or 17b. Furthermore, the insertion of line narrowing elements in one wavelength path will narrow that wavelength without affecting the bandwidth of the other. The importance of the option of having a region such as region 191, where both wavelengths are spatially collinear is that for operations such as intracavity sum frequency generation where two wavelengths are summed in a nonlinear crystal to produce a third, shorter wavelength, it is required that both wavelengths be spatially collinear through the nonlinear crystal.

Figure 12:
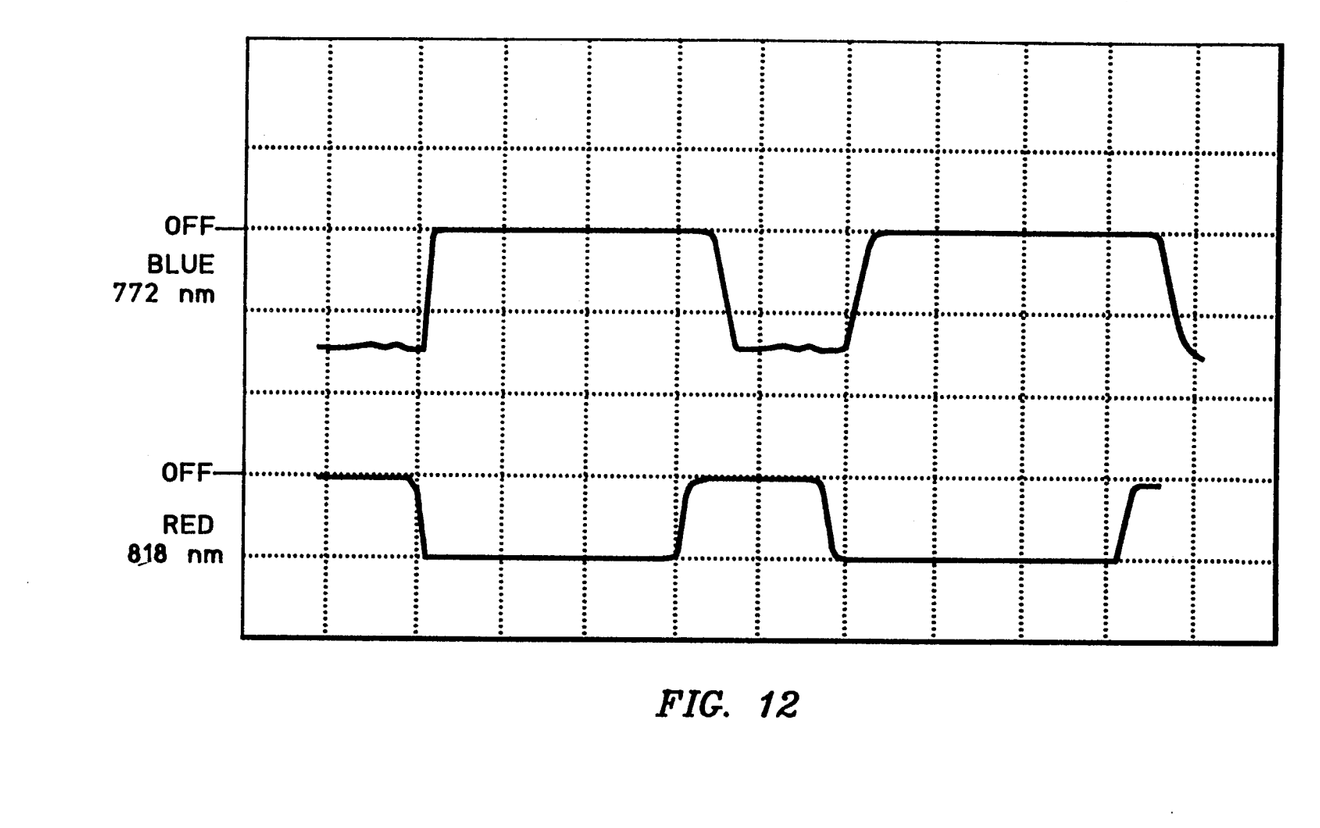
FIG. 12 illustrates chopped operation at two wavelengths.

Looking now to FIG. 12, some of the results of the operation of an embodiment of FIG. 1a are shown. In this exemplary case, the prism 21 and HR flats 17 and 17' are aligned to establish resonant paths within laser resonator cavity 15 for 772 nm and 818 nm. The resonant path for 772 nm extends from HR flat 17 through prism 21 to fold mirror 10 to fold mirror 10' to output coupler 19. The resonant path for 818 nm extends from HR flat 17' through prism 21 to fold mirror 10 to fold mirror 10' to output coupler 19. Mechanical shutter 116, which may also be an acousto-optic or electro-optic Q-switch or other means for interrupting laser oscillation along path 17a, is aligned to chop only the 772 nm wavelength. Noting FIG. 4, the wavelength pair at 772 nm and 818 nm do not oscillate simultaneously. Noting FIG. 3, the net gain at 772 nm is higher than that at 818 nm. The gain competition, described above, prohibits simultaneous operation at these two exemplary wavelengths using the exemplary mirror coatings. However, when the higher gain transition at 772 nm is blocked by the mechanical shutter or other appropriate means, the lower gain transition at 818 nm can operate. Thus, FIG. 12 shows that the laser output cycles between 772 nm and 818 nm.

Sequential operation at two wavelengths is thereby obtained in such a case with only a single chopper. The duty cycle is much less than 50% for the blue wavelength, and greater than 50% for the red, even though the ratio of clear to black area on the mechanical shutter is 1:1, for example. The reason for this is that as the chopper blade begins to block the feedback along path 17a the net gain at 772 nm drops to zero rapidly. Only a partial attenuation in path 17a is sufficient to reduce the net gain to zero along path 17a and extinguish lasing on the blue line. As soon as a partial attenuation occurs, the net gain at 818 nm exceeds threshold and the red line begins to operate. A similar process occurs as the shutter begins to open. Only when the shutter has opened sufficiently can the blue line begin to operate. Once the blue (772 nm) wavelength begins to be emitted by laser 11, the red wavelength (818 nm) is eliminated from the output 16.

It will be recognized that the "on-time" duty cycle for the blue emission can be adjusted between 0% and 50% in two ways. As the width of the shutter opening is expanded relative to the laser resonator cavity beam size at the shutter, the duty cycle will approach 50%. Alternately, the size of the laser resonator cavity beam diameter can be reduced to a small fraction of the shutter slit width.

Another feature of the laser resonator cavity designed in this inventive concept is depicted in FIG. 1b. This feature is that the laser resonator cavity mode 99 is perfectly collimated in two regions of the laser resonator cavity, and sharply focused in another region. The two regions where the mode is collimated are indicated as 61c and 61c' in FIG. 1b. Collimated region 61c extends from fold mirror 10' through prism 21 to either HR flat 17 or 17'. Collimated region 61c' extends from fold mirror 10 to output coupler 19. Focused region 61f extends from fold mirror 10' through laser crystal 13 to fold mirror 10. The focus or waist 13w occurs within laser crystal 13. The importance of having a collimated region 61c or 61c' is that intracavity elements such as prisms, etalons and birefringent tuners, which are most effective with a collimated beam, can be efficiently utilized. There are several reasons why it is important to provide a focused region 61f in the laser resonator cavity. For end pumping, which is the technique by which the laser shown in FIG. 1a is operated, the highest efficiency and lowest threshold operation occurs when the beam waist within the gain element is small. A second advantage of having a focused region is that if intracavity elements are inserted such as those to effect nonlinear operations such as sum frequency generation, it is important to have a small beam waist near the location in the laser resonator cavity where the crystal is inserted. This is because the efficiency of sum frequency generation, which is an example of a nonlinear operation, depends quadratically on the power density in the beam. Finally, the focused laser resonator cavity mode in laser crystal 13 establishes a gain aperture 13w as discussed above, thereby promoting operation in lowest order spatial mode of the laser resonator cavity and obviating the need for the insertion of a lossy, hard aperture for achieving low order spatial mode operation. A hard aperture was desired for lowest order spatial mode operation in the Javan patent cited above.

Optionally, pump laser 12 can be laser diodes, aluminum gallium arsenide, or indium gallium arsenide, or aluminum gallium indium phosphide, or can be other CW laser sources such as a doubled Nd:YAG laser, or a dye laser, for example, or any other laser source, the output of which is absorbed by laser crystal 13. In addition, laser crystal 13 can be any length, in the exemplary case it is 2 cm long. The length is selected to provide adequate gain at the desired operating wavelength and adequate absorption of the pump laser fluence. In addition to adjusting the length, the concentration of the dopant material is adjustable. In the preferred embodiment of the Ti:sapphire laser the dopant density was 0.03 percent by weight. Densities as high as 0.25 percent of $Ti^{3+}$ by weight may be used, and for other dopant and host combinations the dopant density generally will be adjusted such that the absorption of the pump light by the crystal, which is determined by the optical path of the pump light through the crystal, is sufficiently high, usually in the range of 80-100 percent, while the gain minus the passive losses in the crystal is adequate to provide operation over a predetermined range of wavelengths. For $Cr^{3+}$ this dopant density is generally between about 0.03 percent and 100 percent by weight.

In addition, non-laser sources such as arc lamps or CW filament lamps or flash lamps or other gas filled lamps can be used to excite the laser crystal. For pulsed excitation the output of the laser fabricated in accordance with this inventive concept will be pulsed. For CW excitation, the operation will be either CW or pulsed, depending on whether elements for interrupting cw operation are inserted into the laser resonator cavity. Multifrequency operation in the pulsed mode generally will occur simultaneously during the laser output pulse, but it is also possible to have sequential operation at two or more wavelengths by insertion of intracavity shutters along paths 17a and 17b. In this manner, operation at one or more wavelengths can be blocked while allowing operation at other wavelengths to occur. A laser in accordance with this inventive concept has a wide range of applications, including various medical, sensing, pollution monitoring, laser ranging, aircraft wind speed and wind sheer measurement applications, surveillance and communications.

It should therefore readily be understood that many modifications and variations of the present invention are possible within the purview of the claimed invention. It is therefore to be understood that within the scope of the appended claims the invention may be practiced otherwise than as specifically described.

I claim:

1. A solid state laser for emitting at least two wavelengths within a preselected range of wavelengths in a collinear beam comprising:

a resonator for said at least two wavelengths within a preselected range of wavelengths defining a laser cavity by at least two highly reflective flat elements, two highly reflective concave fold mirror elements and an output coupler reflective element arranged to form a reflective path in said laser cavity therebetween;

a dispersing prism disposed in said laser cavity between one of said concave fold mirrors and said at least two highly reflective flat elements to spatially disperse said at least two wavelengths and said dispersing prism and said at least two highly reflective flat elements are aligned in a manner such that each of said at least two highly reflective flat elements defines a discrete end portion of a separate one of at least two resonant paths in said laser cavity, each for a discrete one of said at least two wavelengths in said preselected range of wavelengths;
a laser crystal disposed in said laser cavity; and
means for optically exciting said laser crystal in an end pumping mode to produce an optical emission that includes said at least two wavelengths in said preselected range of wavelengths.

2. The laser of claim 1 further including:
means disposed in said laser cavity for narrowing the linewidth of one or more wavelengths operating simultaneously in said laser.

3. The laser of claim 2 in which said line narrowing means includes two etalon plates of different thickness disposed in said laser cavity.

4. The laser of claim 2 in which spatial hole burning is reduced owing to said emitting at said at least two wavelengths within said preselected range of wavelengths.

5. The laser of claim 1 further including:
means disposed in said laser cavity for suppressing oscillation of one or more wavelengths within said laser cavity.

6. The laser of claim 5 in which said suppressing means includes a mechanical aperture.

7. The laser of claim 6 in which said means for suppressing oscillation is a mechanical chopper provided with clear and opaque parts, said mechanical chopper is disposed in said laser cavity to suppress oscillation at one wavelength of said at least two wavelengths by alternately placing said clear and said opaque parts in a feedback path for said one wavelength, the width of said clear part is adjusted relative to a resonator mode beam diameter at the position in said laser cavity where said mechanical chopper is disposed to obtain a predetermined ratio value in the range of 0:1 to 1:1 of the time during which said emission occurs at said one wavelength to the time during which said emission occurs at another of said at least two wavelengths.

8. The laser of claim 7 in which sequential said emission of said at least two wavelengths is produced as a result of disposing said mechanical chopper in said laser cavity to suppress oscillation at at least one wavelength which is present when said emission is CW at said dispersing prism and said at least two highly reflective flat elements are aligned to produce resonance in said laser cavity at said at least two wavelengths, at least one of which is absent from said emission when said emission is CW.

9. The laser of claim 5 in which said suppressing means includes an acousto-optic crystal.

10. The laser of claim 5 in which said suppressing means includes an electro-optic crystal.

11. The laser of claim 5 in which said exciting means is means for pumping with a CW beam and optical means disposed between said means for pumping and said laser crystal for matching the CW pump beam to said laser crystal, said laser crystal being excited by said CW pump beam to produce a pulsed laser emission in said preselected range of wavelengths.

12. The laser of claim 1 in which at least one of said highly reflective flat elements is rotatable to enable tuning of an individual wavelength.

13. The laser of claim 1 in which all wavelengths in said laser emission may be tuned to other wavelengths simultaneously while maintaining a constant wavelength separation between all wavelengths.

14. The laser of claim 1 in which said laser crystal has Brewster cut end faces to provide a polarized laser mode within said laser cavity.

15. The laser of claim 1 in which said laser crystal includes a host material doped with activator ions to produce a laser emission in said preselected range of wavelengths when said laser crystal is optically excited by end pumping thereof to produce said emission.

16. The laser of claim 15 in which said host material is a sapphire host material and said activator ions in said sapphire host material include a dopant of $Ti^{3+}$ ions to enable said laser crystal to produce a laser emission within the wavelength range from about 680 nanometers to 1.1 microns when said laser is optically excited by said optically exciting means.

17. The laser of claim 15 in which said activator ions in said host material include a dopant of $Cr^{3+}$ ions in an effective percent concentration between about 0.03 percent and 100 percent by weight and said host material is selected from the group consisting of alexandrite LiCAF, LiSAF and LiSGAF, and mixtures thereof.

18. The laser of claim 1 in which said means for optically exciting said laser crystal is a laser emitting a CW pump beam at one or more wavelengths in the range of approximately 450 nanometers to 550 nanometers.

19. The laser of claim 18 in which said means for optically exciting said laser crystal is an argon ion laser.

20. The laser of claim 1 in which said means for optically exciting said laser crystal is means for generating a pulsed pump beam at a preselected range of wavelengths and optical means disposed between said means for generating a pulsed pump beam and said laser crystal for matching said pulsed pump beam to said laser crystal, said laser crystal being excited by said pulsed pump beam to produce a pulsed laser emission of said at least two wavelengths within a preselected range of wavelengths.

21. The laser of claim 20 in which said means for optically exciting is a laser diode source.

22. The laser of claim 20 in which said means for optically exciting is a laser for emitting said pulsed pump beam at at least one wavelength in the range of approximately 450 nanometers to 550 nanometers.

23. The laser of claim 20 in which said means for optically exciting is the second harmonic of a pulsed Nd:YAG laser.

24. The laser of claim 20 in which said laser crystal is substantially in the form of a cylindrical laser rod having a longitudinal dimension along the cylinder axis and said means for optically exciting is a flash lamp having a long dimension along a first axis which is substantially parallel to said cylinder axis of said cylindrical laser rod for enabling dopant ions in said cylindrical rod to absorb light from said flash lamp along the long dimension of said laser rod.

25. The laser of claim 1 further including:
spectral coatings on at least one of said highly reflective flat elements, said highly reflective concave fold elements, and said output coupler reflective element, the spectral dependence of said spectral coatings is chosen to produce laser emission at at least said two wavelengths in said preselected range of wavelengths and said spectral coatings are more highly reflective at wavelengths where the net gain is lower, and less reflective at wavelengths where the net gain is higher.

26. The laser of claim 1 further including;

at least one appropriate deflecting device disposed between said at least two highly reflective flat elements and said dispersing prism to direct the path of each of the said at least two wavelengths operating within said laser resonator cavity to enable each of the said at least two wavelengths to reflect from approximately the center of one of said at least two highly reflective flat elements.

27. The laser of claim 26 further including:
means disposed in said laser resonator cavity for narrowing the linewidth of one or more frequencies operating simultaneously in said laser.

28. The laser of claim 26 further including:
means disposed in said laser resonator cavity for suppressing oscillation of one or more wavelengths within said laser resonator cavity.

29. The laser of claim 26 in which at least one of said highly reflective flat elements is rotatable to enable tuning of an individual wavelength.

30. The laser of claim 26 in which all wavelengths in said laser emission may be tuned to other wavelengths simultaneously while maintaining a constant wavelength separation between all wavelengths.

31. The laser of claim 26 which said laser crystal has Brewster cut end faces to provide a polarized laser mode within said laser resonator cavity.

32. The laser of claim 26 in which said laser resonator cavity contains a laser resonator cavity mode, a region where said laser resonator cavity mode is collimated and a region where said laser resonator cavity mode is focused to a small waist within said laser crystal.

33. The laser of claim 26 in which said means for optically exciting said laser crystal is a laser emitting a CW pump beam at at least one wavelength in the range of approximately 450 nanometers to 550 nanometers.

34. The laser of claim 26 further including:
spectral coatings on at least one of said highly reflective flat elements, said highly reflective concave fold elements, and said output coupler reflective element, the spectral dependence of said spectral coatings is chosen to produce laser emission at at least said two wavelengths in said preselected range of wavelengths and said spectral coatings are more highly reflective at wavelengths where the net gain is lower, and less reflective at wavelengths where the net gain is higher.

35. The laser of claim 26 in which spatial hole burning is reduced owing to said emitting at said at least two wavelengths within said preselected range of wavelengths.

36. The laser of claim 1 in which said laser cavity contains a laser resonator mode part of which is collimated and another part of which is focused to a small waist within said laser crystal.

37. The laser of claim 36 in which said laser cavity contains two regions the first of which is where simultaneously operating wavelengths are spatially separated, and another region of which is where the simultaneously operating wavelengths are collinear.

38. A solid state laser for emitting at least two wavelengths within a preselected range of wavelengths in a collinear beam comprising:
a resonator for said at least two wavelengths within a preselected range of wavelengths defining a laser cavity by a first flat reflective element, two concave fold reflective elements and an output coupler reflective element to form a reflective path in said laser cavity therebetween;
a laser crystal disposed in said laser cavity;
means for optically exciting said laser crystal in an end pumping mode to produce an optical emission that includes said at least two wavelengths in said preselected range of wavelengths; and
means disposed in said laser cavity between one of said two concave fold reflective elements and said first flat reflective element for tuning said emission in said preselected range.

39. The laser of claim 38 in which said tuning means includes a stack of birefringent plates oriented at Brewster's angle to the resonator mode axis of said laser emission, said birefringent plates having a thin plate and at least one thicker plate, each of said at least one thicker plate having an integral multiple thickness of said thin plate of said birefringent plates.

40. The laser of claim 39 further including:
means disposed in said laser cavity for narrowing the linewidth of at least one wavelength that may be emitted simultaneously with at least one other wavelength by said laser.

41. The laser of claim 39 in which the thickness of said thin one of said birefringent plates is selected to provide a free spectral range of the resulting said stack of birefringent plates to be narrower than the net gain bandwidth of said preselected range of wavelengths.

42. The laser of claim 38 in which said laser cavity contains a laser resonator mode part of which is collimated and another part of which is focused to a small waist within said laser crystal.

* * * * *